May 3, 1960 J. E. R. HARRISON ET AL 2,935,606

TRANSISTORIZED PORTABLE COMMUNICATION SET

Filed Feb. 8, 1957 6 Sheets-Sheet 1 inventors
JOHN EUGENE ROGER HARRISON.
SHOLLY KAGAN.
Alden D. Redfield
Charles M. Hogan.
attorneys inventors
JOHN EUGENE ROGER HARRISON,
SHOLLY KAGAN.
Alden D. Redfield
Charles M. Hogan
attorneys

TRANSISTORIZED PORTABLE COMMUNICATION SET

Filed Feb. 8, 1957 6 Sheets-Sheet 3 inventors
JOHN EUGENE ROGER HARRISON.
SHOLLY KAGAN.
Alden D. Redfield
Charles M. Hogan
attorneys inventors

JOHN EUGENE ROGER HARRISON.

SHOLLY KAGAN.

Alden D. Redfield.

Charles M. Hogan.

attorneys inventors
JOHN EUGENE ROGER HARRISON,
SHOLLY KAGAN.
Alden D. Redfield
Charles M. Hogan.
attorneys.

May 3, 1960 J. E. R. HARRISON ET AL 2,935,606

TRANSISTORIZED PORTABLE COMMUNICATION SET

Filed Feb. 8, 1957 6 Sheets-Sheet 6 inventors
JOHN EUGENE ROGER HARRISON.
SHOLLY KAGAN.

Alden D. Redfield
Charles M. Hogan.
attorneys 2,935,606
Patented May 3, 1960

2,935,606

TRANSISTORIZED PORTABLE COMMUNICATION SET

John Eugene Roger Harrison, Bedford, and Sholly Kagan, Newton Highlands, Mass., assignors to Avco Manufacturing Corporation, Cincinnati, Ohio, a corporation of Delaware Application February 8, 1957, Serial No. 639,075

7 Claims. (Cl. 250—13)

The present invention relates to portable radio transmitting and receiving sets, and specifically to a novel transistorized communication set.

A general object of the invention is to provide a two-way signal set having the following attributes:

(1) Simplicity of construction and operation, paucity of controls, and ease of servicing, so that the convenience of the telephone is approached in wireless communication;

(2) Light weight and small volume;

(3) Ruggedness, strength, durability, and reliability and operational utility in the most hostile environments, such as those imposed by rough handling, mechanical shocks, extremes of temperature, and immersion in water;

(4) Long range;

(5) Self-sufficiency with respect to power source;

(6) Efficiency.

In furtherance of such general objects, the invention is directed to a number of specific objects, including the provision of:

(*a*) A compact tripartite two-way receiver construction comprising an antenna and a two-part housing, one part of which contains the receiver and transmitter circuitry, and the other part of which contains a battery and hand generator, the antenna being removably secured to the first-named part;

(*b*) Transistorized receiver and transmitter circuits;

(*c*) A readily adjustable loaded whip antenna construction, the antenna being tunable over a range of carrier frequencies;

(*d*) The combination of a normally open power switch, an antenna, a transmitter-receiver housing, and means for securing the antenna to the housing and simultaneously closing the power switch;

(*e*) A headphone set including a novel and convenient transmit-receive switch;

(*f*) A transmitter-receiver arrangement in which a diode rectifier is biased in the reverse direction to uncouple or isolate the antenna from the receiver when the transmit-receive switch is in the "transmit" position, and in which the rectifier is biased in the forward or conductive direction when that switch is in the "receive" position;

(*g*) A novel diode recharge switch for the battery;

(*h*) A novel toroidal coil transmitter output circuit;

(*i*) An improved transmit-receive switching circuit;

(*j*) Novel, self-contained power source circuitry.

The unitary result of these complementary improvements is a transistorized portable, two-way communication set of unusual versatility, with high transmitter power and receiver sensitivity, a set which is well suited to rugged service applications and which meets rigorous military operational and environmental requirements.

An illustrative embodiment of the invention, which has been reduced to practice, has the following general characteristics and specifications:

| | |
|---|---|
| Weight | 7 pounds, complete with antenna and headset. |
| Transmitter power output | 3 watts. |

| | |
|---|---|
| Receiver sensitivity | 5 microvolts at signal-to-noise ratio of 10 db. |
| Reliable range | 15 miles. |
| Maximum range | 30 miles. |
| Measurements of two-part housing | 6 in. x 6½ in. x 3 in. |

Subject matter disclosed but not claimed herein is claimed in the following United States divisional patent applications of the same inventors, assigned to a common assignee: Serial No. 715,165, filed February 5, 1958, entitled "Transistorized Portable Communication Set"; Serial No. 746,902, filed July 7, 1958, entitled "Transistorized Detector and Automatic Gain Control Circuit"; and Serial No. 746,823, filed July 7, 1958, entitled "Variable Inductance for Loading Antenna."

For a better understanding of the present invention, together with other and further objects, advantages, and capabilities thereof, reference is made to the following description of the accompanying drawings, in which.

Figure 1:
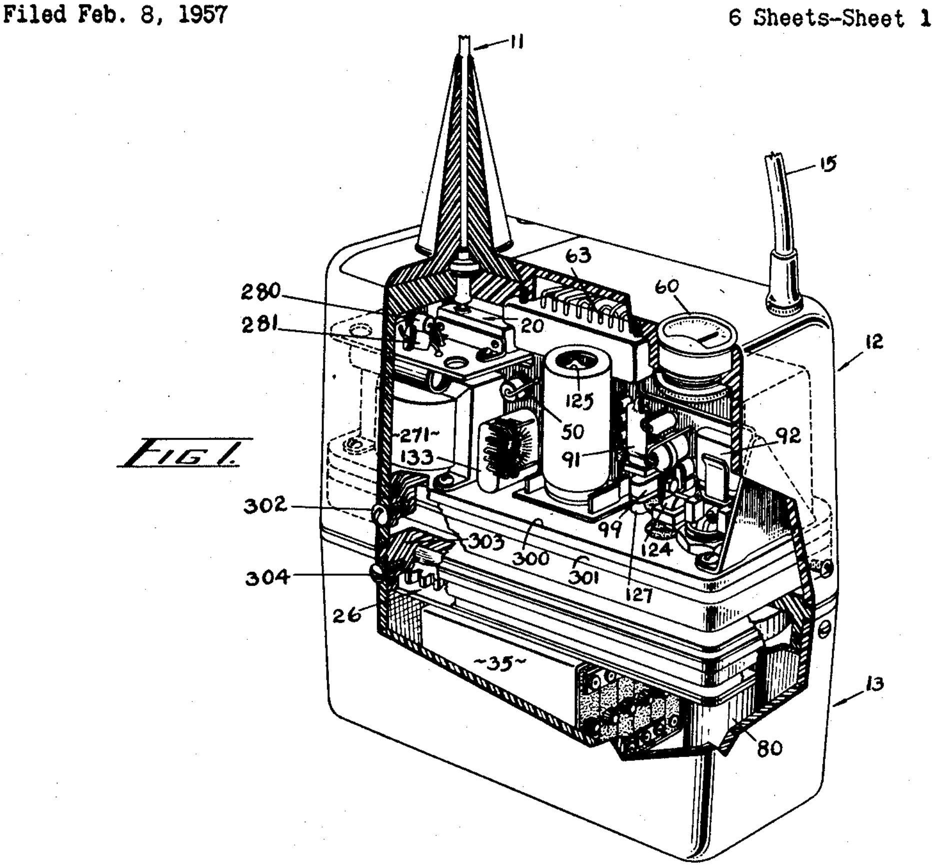
Fig. 1 is a perspective view of a preferred embodiment of a transistorized portable transmitter-receiver in accordance with the invention, portions of the two-unit housing being broken away to facilitate the description of its contents.
Figure 2:
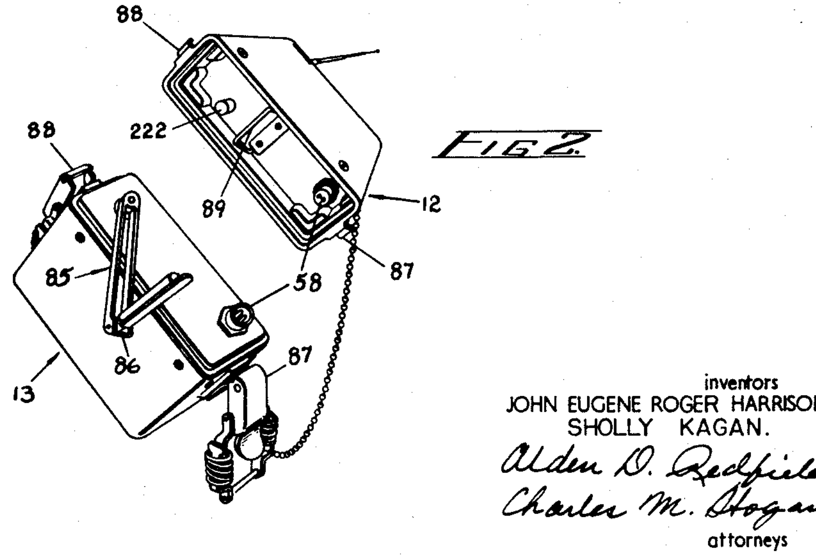
Fig. 2 is a perspective view showing the upper and lower units separately and details of the top of the generator-battery unit and the bottom of the transmitter-receiver circuit unit.
Figures 3, 4:
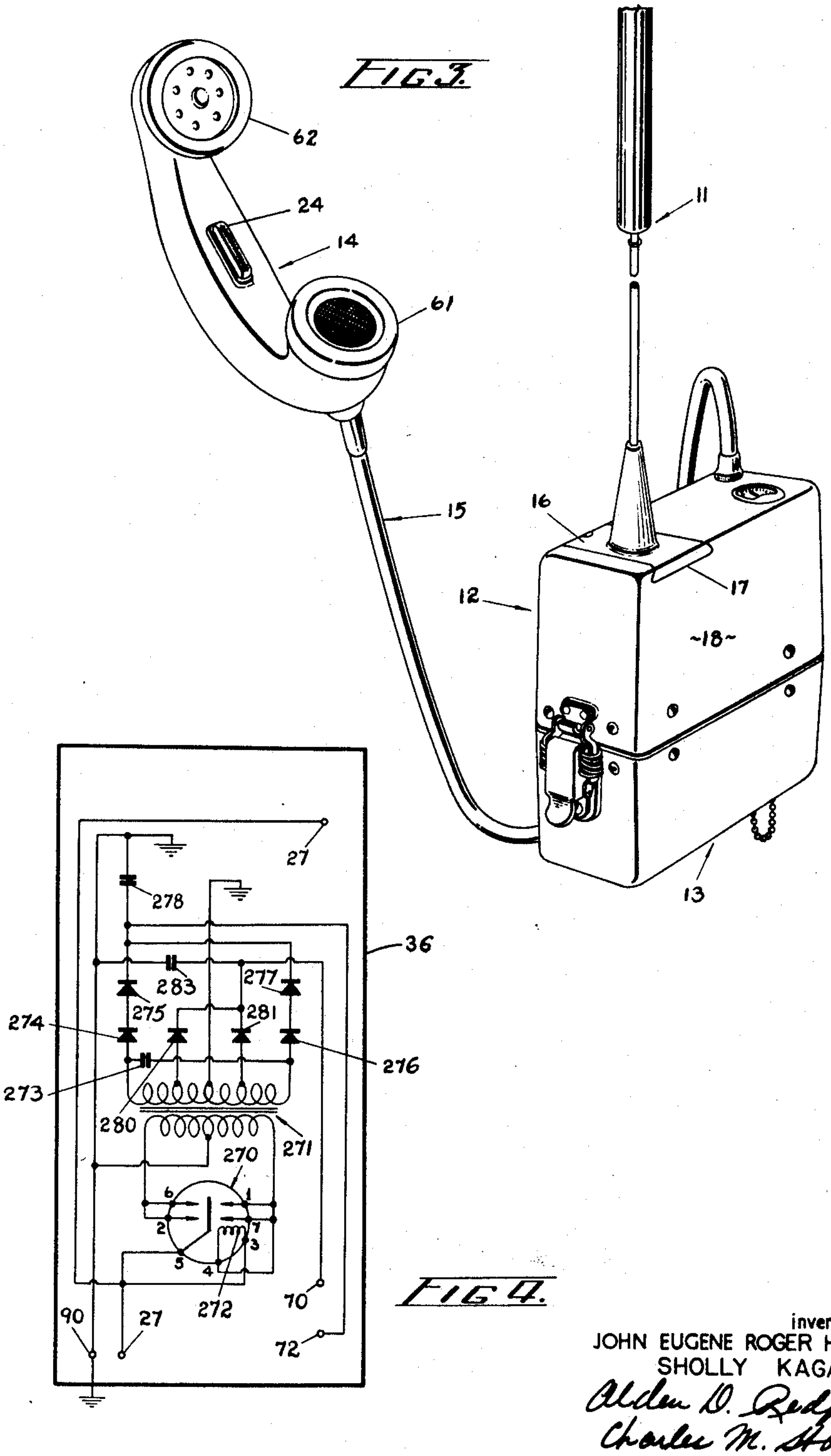
Fig. 3 is a perspective view showing major components of the invention in assembly, the upper portion of the antenna being broken away to facilitate the illustration.
Fig. 4 is a circuit schematic of the high voltage supply.

Referring now generally to Figs. 1–3, the preferred construction there shown comprises an antenna 11 and a housing consisting of an upper unit 12 and a lower unit 13. A headset 14 is connected to unit 12 by a cord 15.

Figure 7:
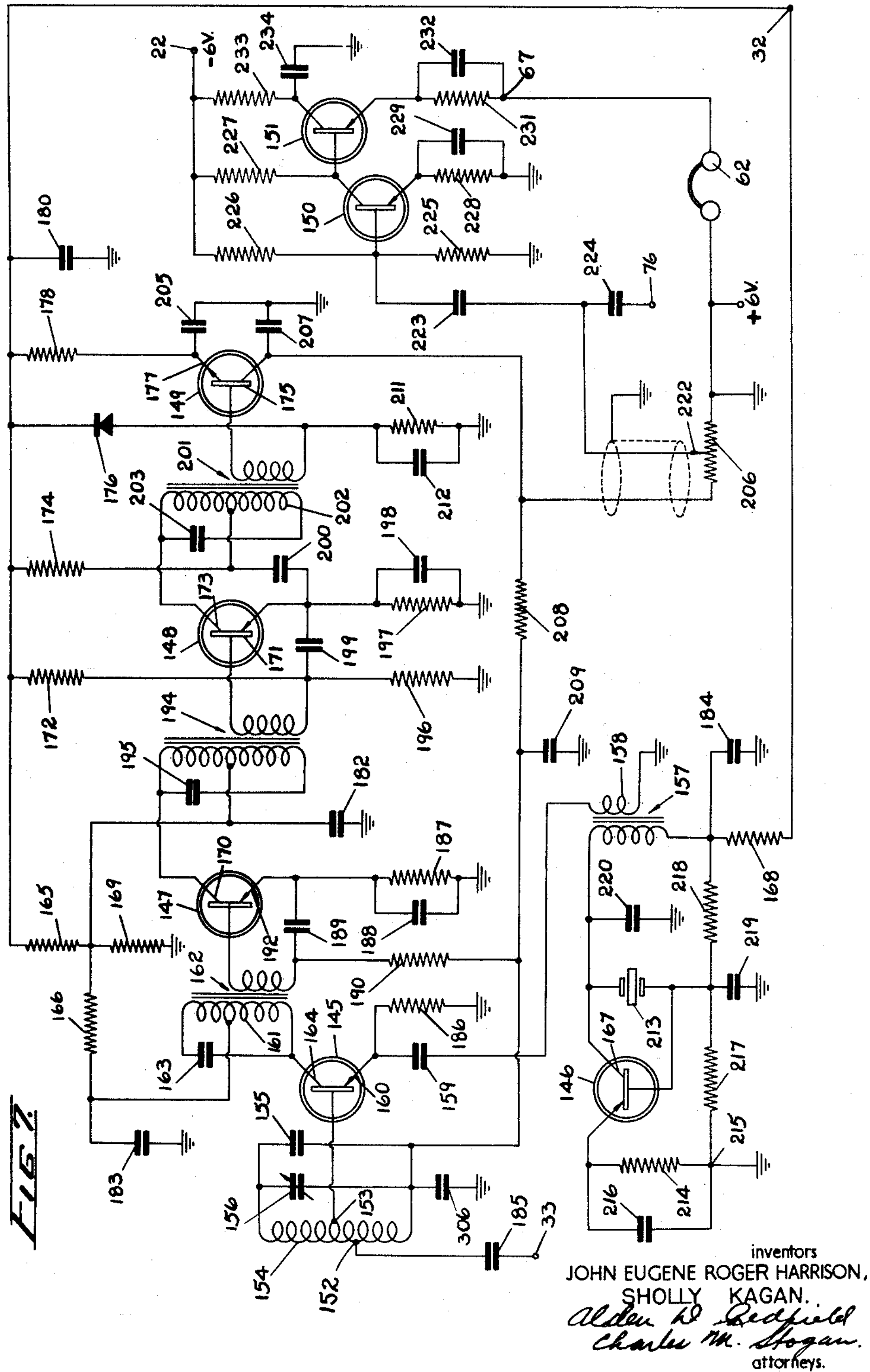
Figures 8, 9, 10:
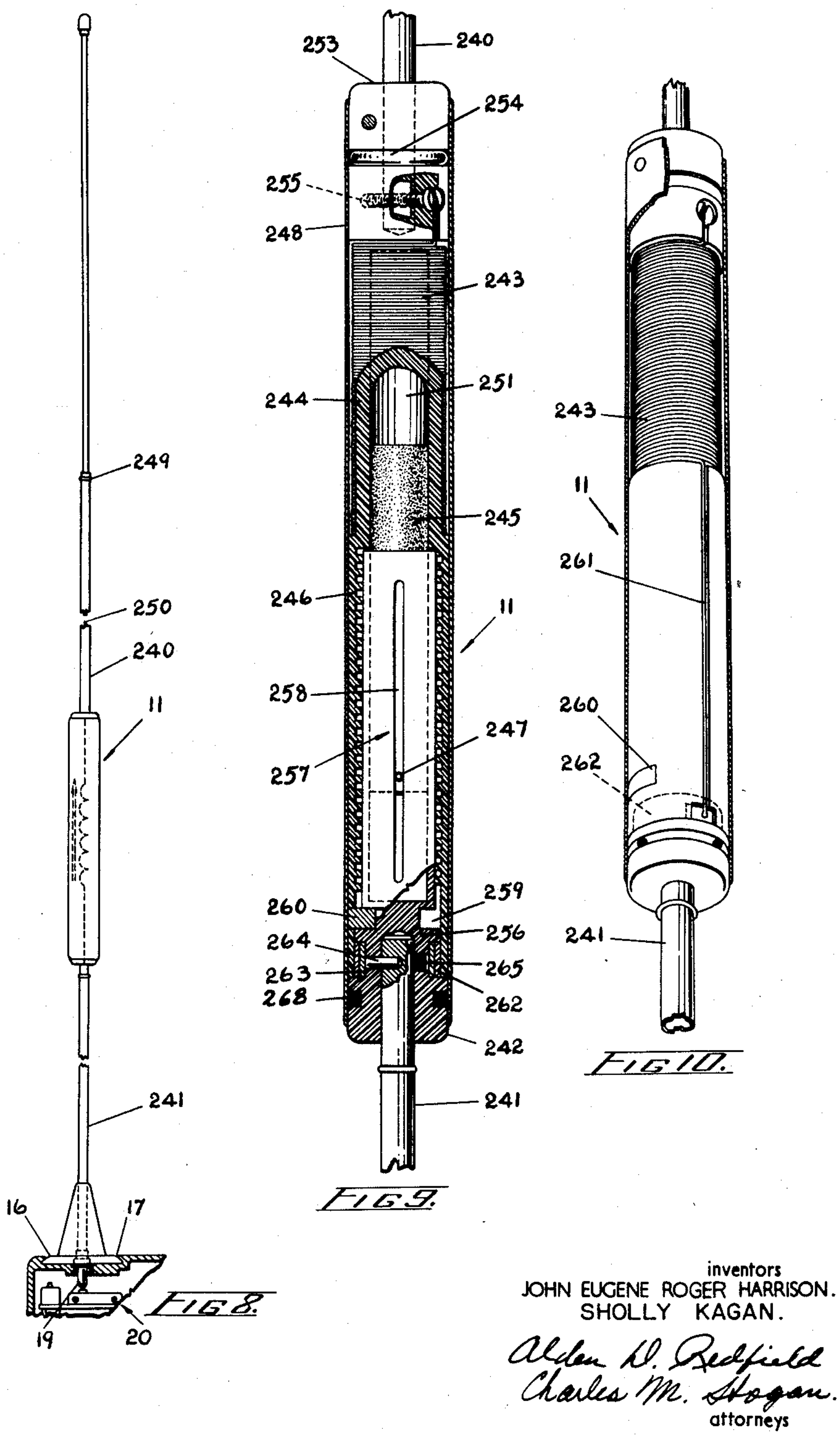
Fig. 8 is an elevational view of the antenna, that portion of the transmitter-receiver to which the antenna is secured being shown in section and the antenna rods being partially broken away to facilitate illustration.
Figs. 9 and 10 are elevational views of the central portions of the antenna, with various parts broken away and others shown in section.

As best shown in Figs. 8, 3, and 1, the antenna is secured to the upper unit by a base 16, which snugly but slidably fits in wedge-like manner into a notch 17, the latter being formed integrally with the housing 18 of unit 12 in such a manner as to complement the beveled edges of the base. The spring-biased push button 19 of a normally open power switch 20 is disposed below the base in such a way that placement of the base in the notch causes the base to depress the push button by cam action so as to close the contacts, thereby connecting terminal 21 (Fig. 5, lower left-hand side) in circuit with terminal 22 of the receiver and also with blade 23 of the transmit-receive switch 24. The purpose of the connection between terminals 21 and 22 is to connect the low voltage power source or battery (as, for example, the negative 6 volt terminal thereof) to the collectors of the transistors 150 and 151 in the two-stage audio section of the receiver (Fig. 7 right end). The purpose of the connection between battery terminal 21 and blade 23 is to set up the proper preliminary circuit closures so that the transmit-receive switch 24, provided in the headset, may be actuated to connect the battery terminal 21 either to the high frequency section of the receiver (as when the switch 24 is in the "receive" position shown in Fig. 5) or to the transmitter and high voltage power supply (when the switch 24 is thrown to the "transmit" position).

Summarizing, therefore, it will be seen that the function of the power switch 20, automatically cammed into closure by the assembly of antenna 11 with the upper unit 12, is to connect the receiver audio stages to the battery and simultaneously to set up conditions such that manipulation of the transmit-receive circuit establishes low voltage power circuits for transmission or reception as desired. Conversely, when the antenna 11 is disengaged from unit 12, low voltage terminal 21 is effectively opened.

Figure 5:
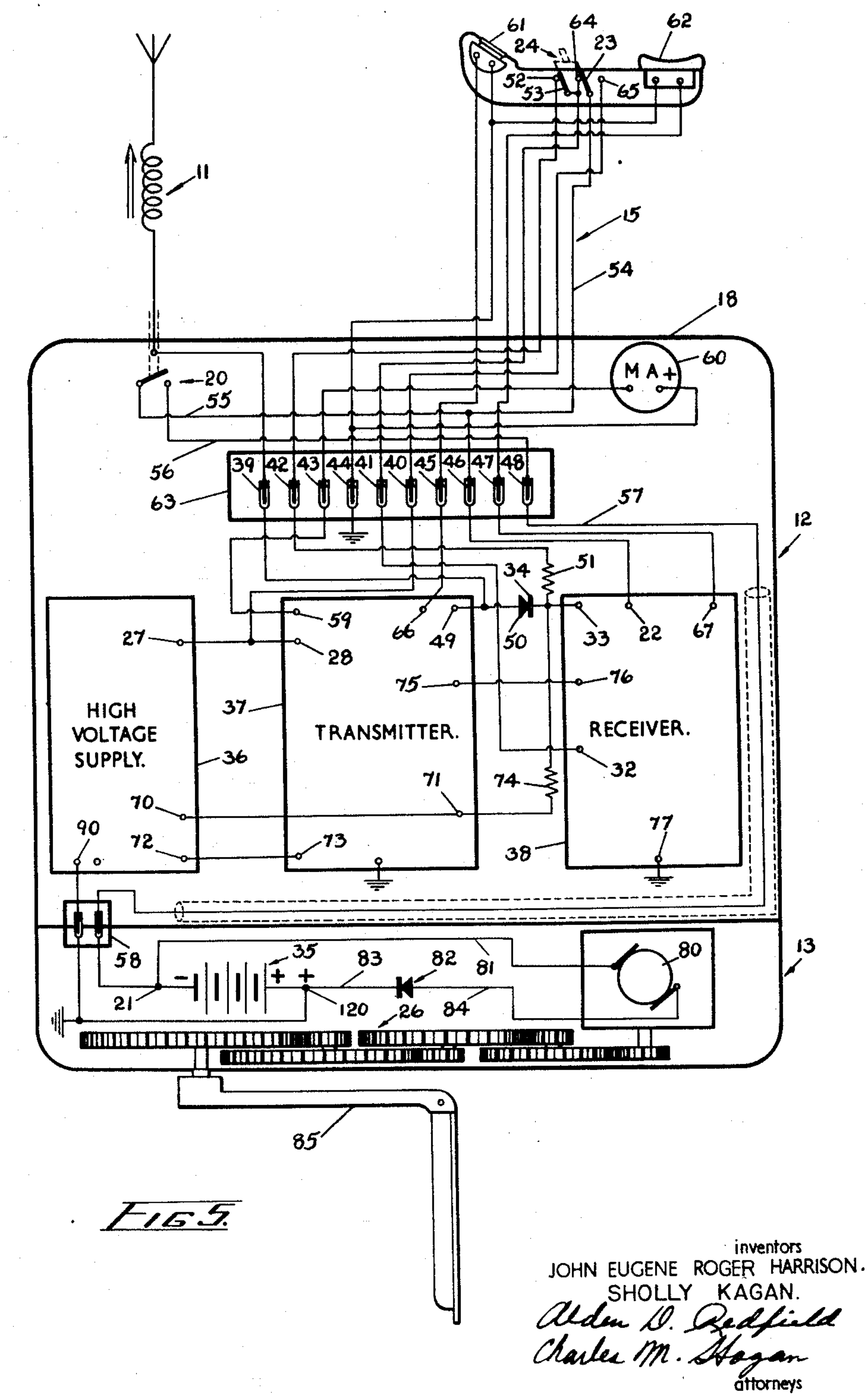
Fig. 5 is a schematic diagram, symbolic and not pictorial, generally in broken form, showing the electrical relationships among, and the connections between, the various major components, the hand-crank being arbitrarily shown below the lower unit outline to facilitate explanation of the circuitry.

Referring now specifically to the transmit-receive switch, it is arranged in the manner illustrated in Fig. 5. In the "transmit" position blade 23 touches contact 65 and places terminals 27 and 28 of the high voltage supply and transmitter, respectively (Figs. 4 and 5), in circuit, through the power switch 20, with battery terminal 21. The conductive path between elements 21 and 27 applies power to drive the vibrator component 270 of the high voltage power supply (Fig. 4). The conductive path between elements 21 and 28 applies low voltage power to the collector of transistor 104 of the transmitter (Fig. 6) and also to the filaments of the transmitter output tube 125 and oscillator tube 91. The transmit-receive switch is a selector, so that the aforementioned terminals 27 and 28 and the circuits associated therewith are not energized when the switch 24 is in the "receive" position.

In the "receive" position blade 23 touches contact 64, and blades 23 and 53 place terminals 32 and 33 of the receiver in circuit with the power switch 20 and battery terminal 21. The conductive path between elements 21 and 32 (via 58, 57, 48, 56, 20, 55, 23, 64, 41) supplies low voltage power to the transistors in the high frequency stages of the receiver. The conductive path between the terminals 21 and 33 (via 42, 52, 53, 64, 23, 55, 20, 56, 48, 57, 58) supplies to the cathode 34 of the antenna switching diode (Fig. 5) a negative biasing potential which is in the forward direction and therefore renders the diode conductive as a short circuit effectively to connect the antenna 11 to the terminal 33 of the receiver.

The transmit-receive switch 24 is conveniently located and built into the headset 14 (Figs. 3, 5). Recapitulating its operation, the transmit-receive switch is so arranged that when it is in the "transmit" position it closes the low voltage power circuits to the transmitter terminal 28 and the power supply terminal 27, with the consequences mentioned. When the switch is in the "receive" position it closes the low voltage power source circuits to the receiver high frequency stages power terminal 32 and antenna terminal 33, supplying power to the high frequency stages thereof and coupling the antenna to the receiver. When the switch 24 is set to "transmit," a positive bias is applied from terminal 70 to cathode 34, rendering the diode nonconductive and disconnecting the antenna from the receiver.

Reference is further made to Fig. 5 for a showing of the details of the connections by reason of which the aforementioned switching functions are performed.

From the foregoing it will be seen that the invention provides, in a transmitter-receiver (Fig. 5) convenience switching features comprising, in combination, a low voltage source of power 35, a high voltage supply 36 including a vibrator, a transmitter 37, a receiver 38 having audio and high frequency stages, a housing, an antenna 11, means 16—17 for securing the antenna to the housing, means 39 for coupling the antenna to the transmitter, electronic switch means (including cathode 34) adapted to be biased to couple the antenna to the receiver, a "talk-listen" selector 24, power switch means 20 mechanically actuated by the antenna when the latter is secured to the housing for coupling the selector (i.e., element 23) and the audio stages of said receiver to said source, "talk" connections 40 between selector 24 and the vibrator and the transmitter so arranged that said selector completes a power circuit (at 27 and 28) between said source and the vibrator and transmitter when the selector is set to its "talk" position, and connections 41, 42 between selector 24 and the receiver 38 so arranged that said selector completes a power circuit (at 32) between the source and the receiver high frequency stages as well as a biasing circuit (at 33) for said antenna switch when the selector is set to its "receive" position.

Referring now to detailed circuit connections for performing the above-discussed functions, the reference numeral 63 in Fig. 5 designates plug and socket connections between the cord 15 of the headset and the transmitter-receiver set. The "transmit-receive" or "talk-listen" switch 24 is mounted conveniently centrally of the headset 14 between the microphone 61 and the earphone 62. The cord 15 includes seven conductors associated with the following connections in the multiple-circuit plug and socket 63, as follows:

39—which is in the circuit conductively connecting the antenna 11 to the transmitter antenna terminal 49 and the antenna switch anode 50;

42—in the circuit conductively connecting the cathode 34 of the antenna switch to the bias source or battery 35 via resistor 51, contact 52 of selector 24, the selector blades 53 and 23, conductors 54 and 55, power switch 20, bus-bar or conductor 56, connections 48, conductor 57, plug and socket connections 58, and terminal 21;

43—in the circuit conductively connecting the transmitter terminal 59 to a milliammeter 60;

44—in the ground return conductive path for the meter 60 and microphone 61 and earphone 62;

41—in the circuit conductively connecting the high frequency receiver stages to the low voltage power source, via the "listen" contact 64 of the selector, blade 23 and conductor 54 (the elements in the path from conductor 54 to terminal 21 being set forth above);

40—in the circuit conductively connecting the vibrator and the transmitter to the low voltage power source via the path originating with terminals 27 and 28 and including "transmit" contact 65 and blade 23 of selector 24 and conductor 54 (the elements in the path between elements 54 and 21 having previously been described);

45—in the circuit conductively connecting the ungrounded lead of the microphone to the transmitter audio input terminal 66;

46—in the circuit conductively connecting the receiver audio stage terminal 22 to the low voltage power terminal 21, via conductor 55, power switch 20, and conductor 56 (the connections between conductor 56 and terminal 21 having previously been described);

47—in the circuit conductively connecting the audio output terminal 67 of the receiver to the earphone 62;

48—in the circuit conductively connecting the conductor or bus-bar 56 to the low voltage power source negative terminal 21.

In Fig. 5 there are also shown the connections from the high voltage positive terminal 70 (at plus 70 volts, for example) to the transmitter terminal 71 and from the high voltage positive terminal 72 (at plus 300 volts, for example) to the transmitter terminal 73. Positive bias is supplied from terminal 71, via resistor 74, to the cathode 34 of the antenna switching diode, so as to render it non-conductive to isolate the antenna from the receiver when the selector 24 is set to "talk." A side-tone circuit is provided by a connection from transmitter output terminal 75 to the receiver terminal 76.

Referring again to Figs. 5 and 1, the low voltage power source comprises a battery 35. The battery is charged by a hand-powered generator 80, one terminal of which is connected to the battery terminal 21 by conductor 81. A diode electronic recharge switch 82 is so connected, between generator 80 and the positive terminal 120 of battery 35, the cathode being connected to such terminal by conductor 83, that the switch effectively opens to disconnect the battery from the generator when the generator is not in operation, thereby preventing battery discharge through the generator. The anode of the recharge switch is connected to the other terminal of generator 80 by conductor 84. The charging generator is powered by a hand-crank 85 and a suitable system of step-up gearing and shafts collectively designated by the reference numeral 26. The hand-crank is secured to a shaft projecting through the top of the lower unit 13 and is of foldable construction and provided with a suitable joint 86 (Fig. 2). As shown in Fig. 2, the upper and lower units 12 and 13 are formed with complementary tight-fitting surfaces and drawn together by clasps 87 and 88. In this respect Fig. 2 shows the actual construction which has been reduced to practice, and the placement of the crank in Fig. 5 is intended to facilitate explanation of operation and not to portray the preferred location. Prior to securing of the clasps, the handle is folded into a slot formed in the lever arm of crank 85 and the entire crank is inserted into the cavity in the bottom of box 12. When the units 12 and 13 are assembled, plug and socket members 58 (Figs. 2 and 5) are closed in circuit, connecting the negative terminal of the low voltage power source 35 (for example, minus 6 volts) to the conductor 57 and the grounded positive terminal of such source to the high voltage supply terminal 90.

The circuit details of the high voltage supply are shown in Fig. 4.

Figure 6:
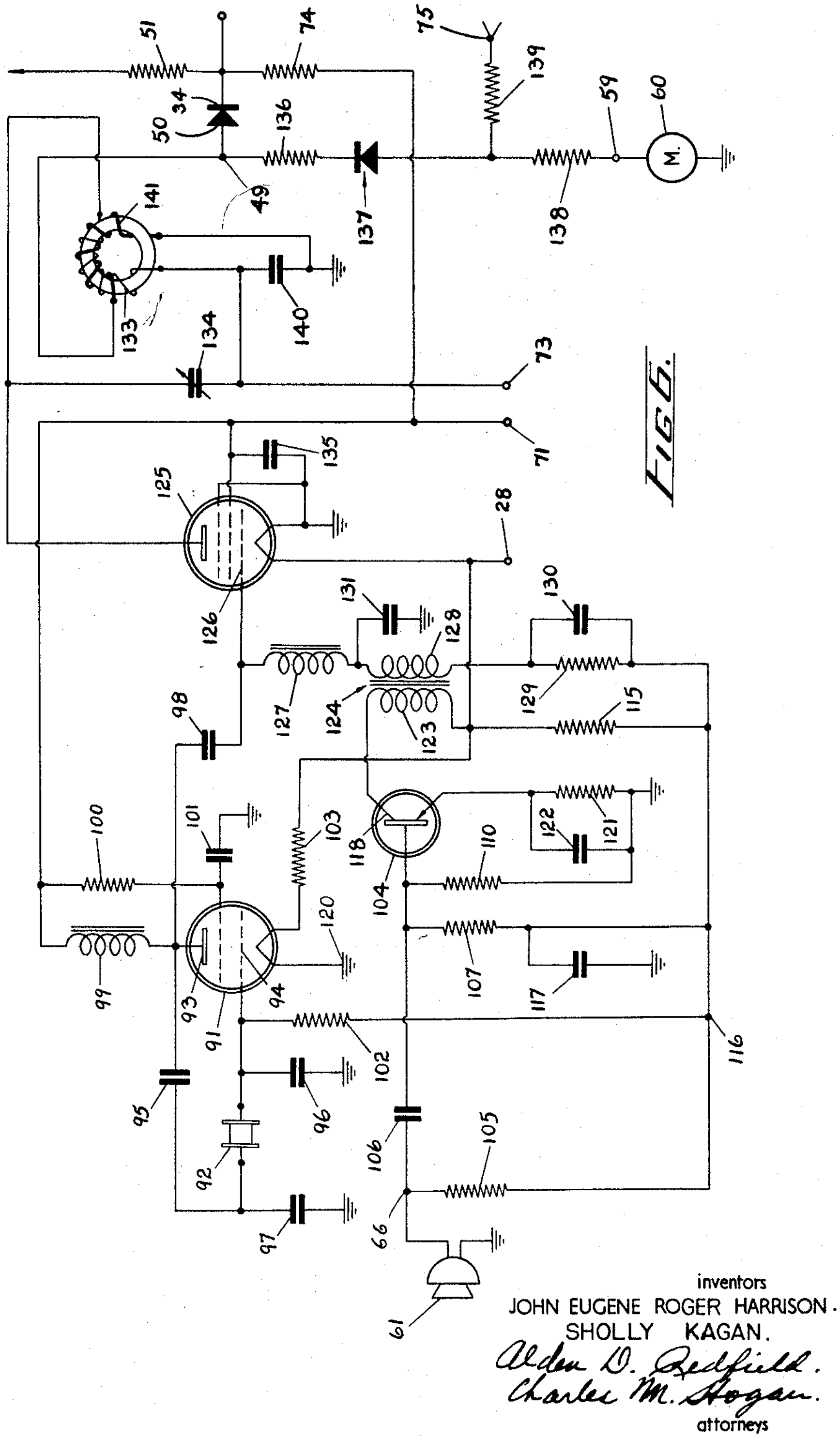
Figs. 6 and 7 are circuit schematics of the transmitter and receiver, respectively.

The novel partially transistorized transmitter is shown in Fig. 6. The transmitter comprises a microphone 61, a modulation stage including a transistor 104 for amplifying the audio output of said microphone, an oscillator having tube 91 for generating carrier frequency signals, and a modulated power output stage coupled to the antenna.

The oscillator is crystal-controlled as to frequency and is basically of the conventional Pierce type. It comprises an electron tube 91 of the tetrode type, having a crystal 92 connected between the anode 93 and grid 94, in series with a blocking condenser 95. The inherent capacitance between grid and filamentary cathode is shunted by a capacitor 96, and the inherent capacitance between plate and cathode is shunted by a series combination of blocking capacitor 95 and capacitor 97. Capacitor 96 controls the amplitude of oscillation and in conjunction with capacitor 97 provides proper working capacity for crystal 92. The oscillator is capacitively coupled to the modulated stage by capacitor 98, and the plate load is formed by an iron core radio frequency choke 99. The choke 99 allows a greater amplitude of oscillation than the resistive load usually employed. The net reactance of the plate-cathode circuit is capacitive, the plate load of tube 91 being tuned to a lower frequency than that of the crystal. The oscillator anode is shunt-fed from the high voltage supply positive terminal 71 (at 70 volts, for example), and voltage is applied to the screen from the same source, the screen circuit having a series dropping resistor 100 and shunt filter capacitor 101. The usual grid resistor 102 is provided. It is connected to conductor 116 so that a negative bias is applied to the oscillator grid. The bias voltage at conductor 116 is filtered by series resistor 115 and shunt capacitor 117, connected between conductor 116 and ground.

One lead of the filament is grounded and the other is connected to the low voltage supply terminal 28, via a dropping resistor 103.

Referring now to the microphone (Fig. 6) and its associated transistorized amplifier, the microphone 61 is coupled to the base of transistor 104 by a network comprising shunt resistors 105 and 107 and series capacitor 106.

The transistor 104 (here shown for purposes of illustration as being of the PNP type) has its collector 118 biased in the reverse direction by connection of that collector to the low voltage source negative terminal 28 (minus 6 volts). The base is biased in a negative fashion relative to the emitter—in other words the emitter is effectively positively biased in its forward direction—by reason of the action of a voltage divider comprising resistors 115, 107, and 110 connected in series between negative terminal 28 and the low voltage positive terminal 120 or ground (Fig. 5). The transistor 104 is connected in the common emitter configuration, the emitter being effectively connected to ground by a parallel combination of low resistor 121 and capacitor 122.

The operation of the temperature-stabilizing resistor is as follows: As the temperature increases the resistance of the emitter-base junction drops, permitting increased emitter current flow through resistor 121. As the current through 121 increases, the voltage across the emitter leg resistor 121 also increases, and therefore the voltage between the base and emitter drops. Since there is less voltage across the base-emitter junction, the emitter current drops. As the base-emitter current is thus kept fairly constant, the collector current also remains constant. The tendency of collector current to rise with temperature is therefore counteracted by controlling emitter current.

The output or collector circuit is completed by the primary 123 of an iron core step-up transformer 124, such primary being connected between the collector 118 and the junction point of terminal 28 and resistor 115. By reason of the inductive coupling between the windings of transformer 124, the amplified output of the microphone is applied to the modulated stage in order to grid-modulate the radio frequency carrier signal output of the oscillator. One of the advantages of this arrangement resides in the fact that windings 123 and 128 are so poled that the direct currents produce opposing magnetic fluxes in the core of transformer 124, thereby assuring freedom from saturation and the distortion caused thereby.

Referring now to the power output stage, it comprises a pentode 125 (Fig. 6) operating as a grid-type modulated amplifier. The high frequency carrier is applied from the output circuit of tube 91, via capacitor 98, to grid No. 1 of the pentode tube at 126. As previously mentioned, the audio signals are applied to transformer 124. Connected between grid 126 of the modulated tube and ground (and serially arranged) are: iron core radio frequency choke 127, secondary 128, and a parallel combination of grid resistor 129 and capacitor 130, the latter being effectively a short circuit for audio frequency signals. Choke 127 and the R.F. ground (capacitor 131) keep radio frequency signals out of the modulation stage.

Referring now to the output arrangements of the modulated tube 125, the anode load comprises a tuned circuit consisting of a high-Q toroidal coil 133 and condenser 134, this combination being connected in series between anode and the high voltage terminal 73 (300 volts). The suppressor is connected to the grounded cathode terminal in usual fashion, and the screen is connected to high voltage terminal 71 (at 70 volts, for example) and provided with a shunt filter condenser 135.

The low-potential lead of coil 133 is grounded by capacitor 140, and the coil is very closely coupled to secondary 141, connected between antenna terminal 49 and ground.

The construction and operation of antenna switch 34, 50 and its biasing circuits 51 and 74 are described above.

The toroidal coil maintains its high Q when confined in a small space, due to the enclosed lines of force. It also has a very high coupling factor between primary and secondary.

In the modulation cycle: As the negative side of the audio signal is applied to the grid it supplements the bias already present and cuts off the current flow to the plate. As the audio signal becomes positive it opposes the negative bias, causing increased current flow. In this way the amplitude of the amplified carrier is varied at an audio rate.

In operation, audio signals from the microphone 61 are amplified by the transistor 104 stage and modulated in tube 125 on the high-frequency carrier signals generated by the oscillator 91 stage. The resultant amplitude-modulated signals appear in amplified form at the output of the tube 125 power stage and are radiated by the antenna 11. To provide for measuring and monitoring of the transmitter, side-tone and metering arrangements are provided. Between antenna terminal 49 and ground is a series combination of resistance 136, side-tone detector or rectifier 137, resistance 138, transmitter terminal 59 (Figs. 5 and 6), and tuning meter 60. The meter 60 is employed in tuning the antenna preparatory to transmission. The products of rectification of detector 137, comprising monitoring signals from the transmitter, are applied to the audio input terminal 76 (Figs. 5 and 7) of the receiver by resistor 139, connected to the junction of elements 137, 138, so that the audio stages and earphone 62 of the receiver are used to monitor the transmitter and check its operation.

The circuits of the receiver, as shown in detail in Fig. 7, comprise a mixer stage (transistor 145), a crystal-controlled oscillator (transistor 146), two intermediate frequency stages in cascade (transistors 147 and 148), a detector stage (transistor 149), and two audio stages (transistors 150 and 151).

The antenna is coupled to an inductor-tap 152 in the tuned input circuit of mixer transistor 145 by a capacitor 185. This transistor is of the surface-barrier type, and carrier signals are applied to the base from a tap 153 on a tuned circuit comprising a parallel combination of inductor 154, capacitor 155 and capacitor 156. The input and local oscillator signals are mixed in the emitter diode, the local oscillations being applied to the emitter circuit through a transformer 157, the secondary 158 of which is connected in series with a capacitor 159 between emitter 160 and ground. The collector is tuned to the difference frequency, resulting from the mixing, by the primary 161 of transformer 162, the primary being paralleled by a capacitor 163.

Negative biasing potential is supplied from the low voltage negative terminal 32 to these components: collector 164 of surface-barrier transistor 145, via series resistors 165 and 166, resistor 169 being connected in shunt between ground and the junction of resistors 165 and 166; collector 167 of surface-barrier transistor 146, via series resistor 168; collector 170 of surface-barrier transistor 147, via resistor 165; base 171 of transistor 148, via resistor 172; collector 173 of surface-barrier transistor 148, via resistor 174; base 175 of transistor 149, via diode impedance 176; and emitter 177 of detector transistor 149, via resistor 178. It will be observed that, in the case of each surface-barrier transistor, the collector is reverse-biased—i.e., biased negatively. Suitable filter capacitors, connected in shunt to ground, are provided in this biasing network, as follows: capacitor 180, between low voltage terminal 32 and ground; capacitor 182, between ground and the junction of resistors 165 and 169; capacitor 183, between ground and that terminal of resistor 166 which is remote from terminal 32; and capacitor 184, between ground and that terminal of resistor 168 which is remote from terminal 32.

Continuing now with the description of the "front end" of the receiver, mixer transistor 145 is provided with a stabilizing resistor 186 between emitter and ground. Intermediate frequency signals are selected by the collector tank circuit of the mixer and applied, through transformer 162, to the input circuit or base of intermediate frequency transistor 147, which is connected in the common emitter configuration. A parallel combination of resistance 187 and capacitance 188 is inserted in the emitter lead of transistor 147. Resistance 187 stabilizes the circuit by compensating for temperature drift and variations among transistors. Capacitance 188 prevents degeneration and reduction in gain.

The series resistor 187 in the emitter leg counteracts a rise in collector current with temperature. Most of the collector current flows through resistor 187. The voltage drop across 187 tends to make the emitter 192 negative with respect to ground. The base is also negative with respect to ground, and the base-emitter voltage will be the difference between the AGC voltage applied from resistor 190 and the smaller voltage drop across resistance 187. Now, assuming a temperature-induced increment in collector current, the voltage drop across resistance 187 increases, making the emitter less positive relative to the base than it was before. This decrease in forward-biasing voltage of the base-emitter circuit results in less emitter current, thus causing a compensatory decrease in collector current. Resistor 186 performs a similar stabilizing function with transistor 145.

The first intermediate frequency stage is coupled to the second by a transformer 194, the primary of which is tuned by a capacitor 195 and the secondary of which has a lead connected to the base of transistor 148. This transistor is arranged in the common emitter configuration. The base is negatively biased relative to ground by connection in series with the junction of resistors 172 and 196 of a voltage divider. The emitter is less negatively biased relative to ground by resistor 197, by-passed by capacitor 198. This stage is stabilized by resistor 197. The second intermediate frequency stage is coupled to the detector by a transformer 201, the primary 202 of which is tuned by a capacitor 203 and the secondary of which has a lead connected to the base 175 of transistor 149.

The detector is connected in the common emitter configuration, with signals applied to the base and the emitter grounded for audio frequency currents by capacitor 205. The collector load circuit comprises resistor 206, paralleled by a capacitor 207, each of those elements having a terminal connected to ground.

The detector transistor 149 is biased slightly in the forward direction by the voltage at the base 175 derived through resistor 211 and controlled by diode 176. As A.C. signal is applied through transformer 201, it is rectified in the base-emitter junction, and the derived bias alternately adds to the fixed bias and increases the current flow through the emitter and thus through the collector. As the current flow through the collector increases, so does the voltage across resistor 206. This increased voltage is used to bias the first transistors and produce an AGC (automatic gain control) action.

The audio component of the R.F. signal through transformer 201 is also impressed on transistor 149 through the base-emitter connection. The varying audio bias at the emitter-base junction causes varying current flow through the collector at an audio rate, and because of the transistor action amplification is obtained.

In this receiver the gain control is of the collector voltage control type. There is developed across resistor 206 the AGC voltage, applied, via resistors 208 and 190, to the base of first intermediate frequency amplifying transistor 147, and also applied, via resistor 208, to the base of mixer transistor 145. Filtering action is provided by shunt capacitor 209. As the received signal applied to the mixer input increases in amplitude, the AGC voltage becomes more negative, tending to increase the base and emitter current of transistors 145 and 147 with increasing input signal. This causes the voltage drop across the collector resistors 166, 165 and 168, respectively, to rise, reducing the collector voltage and gain of each stage.

In accordance with one feature of the invention, the detector transistor 149 is temperature-stabilized. For that purpose diode 176 is connected, in its low resistance or conductive direction, effectively between base 175 and the negative terminal 32 of the source of biasing voltage. The return path to ground for diode 176 is completed by resistor 211, by-passed by capacitor 212. The collector of the NPN transistor 149 is biased in the reverse direction by connection to ground, the positive terminal of the low voltage source, via resistor 206. The base is made negative relative to the collector, but less negative than the emitter by reason of the network 176, 211, and 212. The operation of this circuit is such that, when an ambient temperature change tends to increase or decrease collector current, for example, the non-linear resistance or diode 176 responds to the temperature change in a compensatory fashion, rendering the base more negative (less conductive) or less negative (more conductive), respectively, so as to maintain collector current constant. The diode resistance decreases as temperature increases.

Referring now to the local oscillator, it is a transistorized Pierce type, with a tuned circuit equivalent or crystal 213 connected between collector and base of transistor 146. The emitter is biased in a positive direction relative to the base by connection of the resistor 214 to ground at 215, ground being the positive terminal of the low voltage source. Between this point and the negative terminal 32 is a voltage divider comprising resistors 217 and 218 and 168. The base is connected to the junction of resistors 217 and 218, rendering it negative relative to the emitter, and the collector is connected, through the primary inductance of transformer 157, to the junction of resistors 218 and 168, rendering the collector negative relative to the base and therefore biasing the collector circuit in the reverse direction. This oscillator circuit supplies the local oscillations to the mixer stage of the receiver.

Coming now to the audio system, sliding contact 222 on resistor 206 functions as the adjustable element of a volume control potentiometer and is coupled by series capacitor 223 and shunt resistor 225 to the base of transistor 150 of the first audio stage.

The collector of PNP transistor 150 is biased negatively (in reverse direction) relative to the base, by connections of collector and base to negative source terminal 22, via resistor 227 and higher-value resistor 226, respectively. The base is connected to the junction of resistors 225 and 226. Inserted in the emitter leg is a stabilizing resistor 228, by-passed by capacitor 229. The emitter is less negative than the base, the drop across resistor 228 being less than the voltage applied to the base.

Transistor 150 is direct-coupled to transistor 151, the collector of the former being connected to the base of the latter. The collector of transistor 151 is grounded by capacitor 234, and that transistor is connected in the common collector configuration. The output load (earphone 62) is in series with stabilizing resistor 231. The latter is by-passed by capacitor 232. The collector of PNP transistor 151 is biased negatively relative to the base by connections of collector and base to negative source terminal 22, via resistor 233 and higher-value resistor 227, respectively. Resistor 233 and capacitor 234 form a decoupling filter to prevent low frequency regeneration or "motor-boating."

This audio system amplifies a relatively small audio signal (.03 v. R.M.S.) to produce full output with little distortion and also will produce relatively the same output with a usable distortion level when a signal of .20 v. R.M.S. is applied to the input. It also has almost constant amplification from −55° C. to +55° C.

The side tone input terminal is shown at 76. It is capacitively coupled to the base of the first audio transistor 150 by capacitor 224, to the end that the audio stages and earphone 62 function to "monitor" the transmitter when the latter is in operation.

In the operation of the receiver incoming signals from the antenna are selectively applied to mixer transistor 145 and are there heterodyned against local oscillations produced by the crystal-controlled oscillator circuitry, so that amplified carrier signals of intermediate frequency are applied to the intermediate frequency amplifying system comprising the cascaded transistors 147 and 148. The modulation components are derived in the detector stage comprising transistor 149, and the audio signals are amplified in the two-stage audio amplifying network comprising transistors 150 and 151.

One of the features of the invention is a novel loaded whip antenna 11 (Figs. 8–10). It comprises an upper metallic rod 240, a lower metallic rod 241, and adjustable-inductance loading means between these conductive rods. To facilitate transportation, each of the rods may comprise a number of hollow metallic sections joined with a forced telescopic fit, as shown at 249.

A continuous flexible wire 250 is located within the upper rod, and a similar wire is within the lower rod. When the antenna is made in tubular sections, the several sections may be detached from each other and conveniently folded in order to save space.

The lower rod is secured to a cap 242 formed as an integral part of a cylindrical sleeve 257. A Litz wire loading inductance or coil 243 is wound on a cylindrical bobbin 244. The upper portion of the bobbin is axially bored, as shown at 251, to receive a cylindrical container 245 of a synthetic fibre material, within which is disposed an iron or ferrite tuning slug. In order to provide for axial positioning or displacement of the tuning slug relative to coil 243, and therefore tuning of the antenna, the lower portion of the bobbin is internally screw-threaded at 246. Container 245 is formed with an outward projection 247 which engages the groove of the thread 246 in such a way that rotation of the bobbin 244 and resultant thrust of the screw thread causes the container 245 to move upwardly or downwardly, depending on the direction of rotation of the bobbin.

The top rod 240 is secured to a generally circular cap 253 formed integrally with bobbin 244. The cap 253 is secured to an outer sheath 248 in rigid assembly, waterproofing being effected by the provision of a plastic O-ring 254, placed in a groove which is formed in cap 253. Screw 255 serves as a binding post for one lead of coil 243 and projects from the exterior of the cap 253 through the top rod 240. The arrangement is such that the top rod 240, cap 253, O-ring 254, bobbin 244, and manually operated sheath 248 are turned in unison to effect adjustment of the axial position of slug container 245 relative to the coil 243.

Formed integral with the lower cap is the base 256 of a sleeve 257. The sleeve is slotted at 258 to permit contact of projection 247 (extending through the slot) with the screw thread 246 in the bobbin. Sleeve 257 is provided with an interior bore in continuity with the interior bore 251 of bobbin 244. The sleeve fits over container 245 and provides for wide loading adjustment. In order to secure the sheath and bobbin in axial position relative to the base 256 of the sleeve, such base is formed with an annular groove 259, formed to receive and to engage a complementary projection 260 secured to the sheath 248. A water-tight plastic O-ring 268 is located in an annular groove in cap 242. From the foregoing it will be seen that as sheath 248 and bobbin 244 are turned, sleeve 257 and its base 256 and cap 242 are stationary, so that the lead of the thread 246 causes axial or linear displacement of projection 247 and container 245 in order to vary the loading as desired. Accordingly, slip ring contact arrangements are provided so as to establish a conductive relationship between lead 261 of coil 243 and the lower antenna rod 241. To that end lead 261 is secured to an outer slip ring 262, which rotatably embraces an interior ring 263 permanently conductively connected to lower rod 241 by a pin 264, the rod being biased against the pin by a spring 265.

Describing the adjustment of the antenna in other words, the sleeve 257 and its base 256 and the inner slip ring and the lower cap 242 and the lower rod 241 are stationary members which neither rotate nor move axially. The bobbin 244 and coil 243 and upper cap 253 and upper rod 240 and sheath 248 rotate in unison. Such rotation causes the screw thread 246 to move relative to projection 247. A screw thread moving relative to a projection which cannot rotate causes axial displacement of such projection. To permit such axial displacement, the slug container 245 and its projection 247 are mounted with one degree of freedom relative to sleeve 257 to permit axial displacement within the sleeve. This is accomplished by providing slot 258 in the sleeve 257, which slot permits axial movement of projection 247. The net result of the foregoing is that when sheath 248 is manually rotated in one direction or the other, the slug container 245 and the magnetic slug are advanced or retracted relative to the coil 243.

The antenna is rugged, of small size, collapsible, light in weight and waterproof, and it maintains efficient operation over a substantial tuning range.

The high voltage supply (Fig. 4) comprises a vibrating interrupter 270 (i.e., non-synchronous vibrator) and a step-up transformer 271. Power is applied to the magnet coil 272 by the circuit including grounded low voltage positive terminal 90, a part of the primary of transformer 271, coil 272, and the low voltage negative terminal 27. The secondary of the transformer is tuned by a capacitor 273. Each of the secondary leads is in series with a pair of rectifiers 274, 275, or 276, 277, and the cathodes of the rectifiers 275 and 277 are connected to provide the high potential terminal 72 (300 volts, for example). Filtering is provided by shunt capacitor 278. Tapped-down secondary leads are in series with rectifiers 280 and 281. The cathodes of these rectifiers are connected to provide the high potential terminal 70 (70 volts, for example). Filtering is provided by shunt capacitor 283.

In the following description of the mechanical structure of a portable communication set embodying the invention, the reference numerals used in the description of the circuitry and principal components thereof are retained.

Referring now specifically to Figs. 1 and 2, there are shown the upper and lower housings 12 and 13, each hermetically sealed and molded in generally rectangular shape from a suitable synthetic plastic material. The two halves are of course normally clipped together as shown in Fig. 1 and operated as one unit. Disposed within the upper half are the receiver and transmitter components, of which the following are indicated in Fig. 1: the antenna-actuated power switch 20, the power supply transformer 271, the antenna switching diode 50, 34, the toroidal output coil 133 of the transmitter, the transmitter output tube 125, the transmitter chokes 99 and 127, the transmitter modulation transformer 124, the transmitter oscillator crystal 92, the transmitter oscillator tube 91, the socket 63, and two of the high voltage supply rectifiers, 280 and 281. Such components are secured on or in fixed position with relation to a bottom member or base plate 300 which is provided with an annular groove suitably formed to receive a waterproofing seal 301 and is suitably tapped to receive screws 302, which project through the exterior casing to maintain such base plate in secure position.

The lower unit 13 is similarly provided with a plastic lid or top plate 303, secured in position by screws 304. This lower unit contains the hand generator 80, the low voltage power supply battery 35, and the train of gears 26.

When the units are separated, as shown in Fig. 2, the receiver volume control 222 may readily be adjusted. When the units are put together, the hand crank 86 is in folded position, and the plug and socket connections 58 are then engaged, whereupon clips 87 and 88 are closed to maintain the assembly.

This mechanical construction has been found to offer unique advantages as to strength and light weight, simplicity and service ease.

The following circuit parameters are furnished by way of illustration and not limitation, and they have been found satisfactory in one successful embodiment of the invention:

*Transmitter parameters*

| | |
|---|---|
| Carrier frequency | 2–6 megacycles. |
| Tube 91 | Type 5672. |
| Tube 125 | Type 5618. |
| Transistor **104** | Type 2N185. |
| Diode **50, 34** | Type IN93. |
| Diode **137** | Type T–12–G. |
| Crystal **92** | Type CR18/U. |
| Meter **60** | 0–1 milliampere. |
| Capacitor **97** | 4.7 microfarads. |
| Capacitor **95** | 0.005 microfarad. |
| Capacitor **96** | 27 microfarads. |
| Capacitor **98** | 0.005 microfarad. |
| Capacitor **101** | 0.01 microfarad. |
| Capacitor **106** | 8 microfarads. |
| Capacitor **117** | 30 microfarads. |
| Capacitor **122** | 140 microfarads. |
| Capacitor **130** | 5 microfarads. |
| Capacitor **131** | 0.005 microfarad. |
| Capacitor **135** | 0.005 microfarad. |
| Capacitor **140** | 0.005 microfarad. |
| Capacitor **134** | 40–250 microfarads. |
| Resistor **100** | 10,000 ohms. |
| Resistor **102** | 33,000 ohms. |
| Resistor **103** | 82 ohms. |
| Resistor **136** | 2700 ohms. |
| Resistor **51** | 2200 ohms. |
| Resistor **74** | 47,000 ohms. |
| Resistor **138** | 2700 ohms. |
| Resistor **139** | 27,000 ohms. |
| Resistor **115** | 150 ohms. |
| Resistor **129** | 27,000 ohms. |
| Resistor **121** | 68 ohms. |
| Resistor **105** | 330 ohms. |
| Resistor **107** | 5600 ohms. |
| Resistor **110** | 2200 ohms. |
| Microphone **61** | Single button carbon microphone, nominal impedance 50 ohms. |
| Transformer **124** | Grid modulation transformer, 500 ohms primary, 25,000 ohms secondary. |
| Transformer including primary **133** | Toroidal transformer, tunes 2–3.5 megacycles, 4–6 megacycles, iron core. |

*Receiver parameters*

| | |
|---|---|
| Transistor **145** | Type SB100. |
| Transistor **147** | Type SB100. |
| Transistor **148** | Type SB100. |
| Transistor **149** | Type 2N147. |
| Transistor **150** | Type 2N185 |
| Transistor **151** | Type 2N185 |
| Transistor **146** | Type SB100. |
| Crystal **213** | Type CR18U. |
| Diode **176** | Type 320G. |
| Capacitor **183** | 0.1 microfarad. |
| Capacitor **306** | 0.1 microfarad. |
| Capacitor **156** | Order of 400 microfarads. |
| Capacitor **155** | Temperature-compensating, 33 micromicrofarads. |
| Capacitor **185** | 0.001 microfarad. |
| Capacitor **159** | 0.01 microfarad. |
| Capacitor **188** | 0.1 microfarad. |
| Capacitor **189** | 0.1 microfarad. |
| Capacitor **182** | 0.1 microfarad. |
| Capacitor **199** | 0.1 microfarad. |
| Capacitor **200** | 0.1 microfarad. |
| Capacitor **198** | 0.1 microfarad. |

| | |
|---|---|
| Capacitor 212 | 0.1 microfarad. |
| Capacitor 205 | 0.1 microfarad. |
| Capacitor 207 | 0.05 microfarad. |
| Capacitor 180 | 140 microfarads. |
| Capacitor 209 | 8 microfarads. |
| Capacitor 223 | 3 microfarads |
| Capacitor 229 | 30 microfarads. |
| Capacitor 232 | 4 microfarads. |
| Capacitor 234 | 30 microfarads. |
| Capacitor 224 | 0.1 microfarad. |
| Capacitor 216 | 0.1 microfarad. |
| Capacitor 219 | 68 microfarads. |
| Capacitor 220 | 27 microfarads. |
| Capacitor 184 | 0.1 microfarad. |
| Resistor 166 | 1000 ohms. |
| Resistor 186 | 4700 ohms. |
| Resistor 165 | 1800 ohms. |
| Resistor 169 | 4700 ohms. |
| Resistor 190 | 1000 ohms. |
| Resistor 172 | 2200 ohms. |
| Resistor 196 | 4700 ohms. |
| Resistor 174 | 1000 ohms. |
| Resistor 197 | 1000 ohms. |
| Resistor 178 | 100 ohms. |
| Resistor 211 | 39 ohms. |
| Resistor 225 | 3300 ohms. |
| Resistor 226 | 18,000 ohms. |
| Resistor 227 | 3300 ohms. |
| Resistor 228 | 1000 ohms. |
| Resistor 231 | 220 ohms. |
| Resistor 233 | 100 ohms. |
| Resistor having contact 222 | 10,000 ohms. |
| Resistor 214 | 4700 ohms. |
| Resistor 217 | 4700 ohms. |
| Resistor 218 | 4700 ohms. |
| Resistor 168 | 470 ohms. |
| Resistor 208 | 2200 ohms. |
| Resistor 187 | 390 ohms. |
| Coil 154 | R.F. input coil, tunes from 2–3.5 megacycles or 4–6 megacycles. |
| Earphone 62 | 300 ohms impedance earphone with 125 ohms D.C. resistance. |

*Other parameters*

| | |
|---|---|
| Voltage at high voltage supply terminal 70 | 70 volts. |
| Voltage at high voltage supply terminal 72 | 300 volts. |
| Intermediate frequency | 455 kilocycles. |
| Voltage of battery 35 | 6 volts. |
| Diode 82 | Type IN91. |
| Diode having anode 50 | Type IN93. |
| Antenna coil 243 | 125 turns of 15/40 litz wire, resonates from 1.9 to 4.8 megacycles. |
| Rectifiers 280 and 281 | Type IN92. |
| Rectifiers 274, 275, 276, and 277 | Type IN93. |

While there has been shown and described what is at present considered to be the preferred embodiment of the invention, it will be understood by those skilled in the art that various modifications and changes and substitutions of equivalents may be made therein within the true scope of the invention as defined by the appended claims.

What is claimed is:

1. In a portable broadcast transmitter-receiver set, the combination of a pair of casings, a battery source of power and a hand-powdered charging generator mounted in one of said casings, a folding crank for said generator, said crank being mounted on the top of said one case with its arm parallel to said top, said casings being so proportioned as to form a waterproof joint at the top of said one casing and the bottom of the other casing, said other casing being formed with a recess for receiving said crank, and fastening means for securing said casings together so that the crank when folded is positioned between said casings.

2. In a portable transmitter-receiver, the combination of a housing structure having a top formed with a transverse notch on its exterior, an antenna including a rod, means for mounting the antenna comprising a wedge extending transversely and slidably secured to the lower end of said rod and formed as a complement to said notch, said wedge being fitted to said notch to support said antenna, and a push button power switch actuated by said wedge.

3. In a portable broadcast transmitter-receiver having a housing, the combination of an antenna mounting and a power switch, said switch being mounted within the housing and including a push button adapted to be depressed to close the switch and said mounting including complementary wedge and slide members so arranged that insertion of the wedge in the slide depresses the push button, the wedge bing adapted to be secured to an antenna, and the slide bing formed on the exterior of said housing.

4. In a transmitter-receiver, the combination of a low voltage source of power, a high voltage supply including a vibrator, a transmitter, a receiver having audio and high frequency stages, a housing, an antenna, means for securing the antenna to the housing, means for coupling the antenna to the transmitter, electronic switch means adapted to be biased to couple the antenna to the receiver, a "talk-listen" selector, power switch means mechanically actuated by the antenna when the latter is secured to the housing for coupling the selector and the audio stages of said receiver to said source, "talk" connections between the selector and the vibrator and the transmitter and so arranged that said selector completes a power circuit between said source and the vibrator and transmitter when the selector is set to its "talk" position, and connections between selector and receiver so arranged that said selector completes a power circuit between the source and the receiver high frequency stages as well as a biasing circuit for said antenna switch when the selector is set to its "receive" position.

5. In a transmitter-receiver having a source of power, a transmitter, a receiver, a headset, a housing, and an antenna, the combination of means for securing the antenna to the housing, a "talk-listen" selector mounted on said headset, power switch means mechanically actuated by the antenna when the latter is secured to the housing for coupling the selector to said source, "talk" connections between the selector and the transmitter so arranged that said selector completes a power circuit between the source and the transmitter when the selector is set to its "talk" position, and connections between the selector and the receiver so arranged that said selector completes a power circuit between the source and the receiver when the selector is set to its "receive" position.

6. In a portable transmitter-receiver, a series combination of an antenna and a diode and a receiver input terminal, a two-position "listen-talk" selector, a low voltage power source, means controlled by the selector for coupling the low voltage source to the diode to bias it into conductivity when the selector is in one position, a high voltage supply, and means for coupling the high voltage supply to the diode to bias the diode in a reverse direction when the selector is in the other position.

7. In a portable transmitter-receiver, a series combination of an antenna and a diode and a receiver input terminal, a two-position "talk-listen" selector, means for normally biasing the diode into non-conductivity, means controlled by the selector for biasing the diode into conductivity only when the selector is in the "listen" position, thereby to connect the antenna to the receiver, and a permanent connection from the antenna to the transmitter.

(References on following page)

References Cited in the file of this patent

UNITED STATES PATENTS

| | | |
|---|---|---|
| 1,545,040 | Dornig | July 7, 1925 |
| 1,857,137 | Byrnes | May 10, 1932 |
| 2,311,472 | Roosenstein | Feb. 16, 1943 |
| 2,329,200 | Hefele | Sept. 14, 1943 |
| 2,439,411 | Mitchell | Apr. 13, 1948 |
| 2,483,187 | Dolberg | Sept. 27, 1949 |
| 2,519,256 | Lee | Aug. 15, 1950 |
| 2,560,320 | Winkler | July 10, 1951 |
| 2,570,436 | Eberhard et al. | Oct. 9, 1951 |
| 2,596,013 | Doriot | May 6, 1952 |
| 2,654,834 | Zarky | Oct. 6, 1953 |
| 2,657,304 | Parks | Oct. 27, 1953 |
| 2,711,513 | Baer | June 21, 1955 |
| 2,769,908 | Stansel | Nov. 6, 1956 |
| 2,780,725 | Johanson | Feb. 5, 1957 |
| 2,789,164 | Stanley | Apr. 16, 1957 |
| 2,794,076 | Shea | May 28, 1957 |
| 2,807,718 | Chressanthis et al. | Sept. 24, 1957 |

FOREIGN PATENTS

| | | |
|---|---|---|
| 20,990 | Great Britain | Sept. 17, 1914 |
| 289,568 | Great Britain | May 2, 1928 |
| 567,334 | Great Britain | Feb. 8, 1945 |
| 740,360 | Great Britain | Nov. 9, 1955 |
| 543,642 | France | June 8, 1922 |

OTHER REFERENCES

Electronics, June 1945, "SCR–300, F-M Walkie-Talkie," pp. 204, 212 and 216.

UNITED STATES PATENT OFFICE

CERTIFICATE OF CORRECTION

Patent No. 2,935,606 May 3, 1960

John Eugene Roger Harrison et al.

It is hereby certified that error appears in the printed specification of the above numbered patent requiring correction and that the said Letters Patent should read as corrected below.

Column 2, line 6, for "6 in." read -- 8 in. --; column 8, line 67, for "165 and 168" read -- 169 and 169 --; column 14, lines 21 and 22, for "bing", each occurrence, read -- being --.

Signed and sealed this 31st day of January 1961.

(SEAL)
Attest:

KARL H. AXLINE
Attesting Officer

ROBERT C. WATSON
Commissioner of Patents